(12) United States Patent
Hultquist et al.

(10) Patent No.: US 7,232,611 B2
(45) Date of Patent: Jun. 19, 2007

(54) COMPONENT INCLUDING A ZIRCONIUM ALLOY, A METHOD FOR PRODUCING SAID COMPONENT, AND A NUCLEAR PLANT INCLUDING SAID COMPONENT

(75) Inventors: Gunnar Hultquist, Stallarholmen (SE); Magnus Limbäck, Västerås (SE); Gunnar Wikmark, Uppsala (SE)

(73) Assignee: Westinghouse Electric Sweden AB (SE)

( * ) Notice: Subject to any disclaimer, the term of this patent is extended or adjusted under 35 U.S.C. 154(b) by 357 days.

(21) Appl. No.: 10/204,846

(22) PCT Filed: Mar. 20, 2001

(86) PCT No.: PCT/SE01/00576

§ 371 (c)(1),
(2), (4) Date: Aug. 26, 2002

(87) PCT Pub. No.: WO01/71728

PCT Pub. Date: Sep. 27, 2001

(65) Prior Publication Data

US 2003/0079808 A1    May 1, 2003

(30) Foreign Application Priority Data

Mar. 20, 2000    (SE)    .................................... 0000919

(51) Int. Cl.
C23C 8/06    (2006.01)
(52) U.S. Cl. ...................................... 428/472; 376/457
(58) Field of Classification Search ............... 428/469, 428/472; 376/457
See application file for complete search history.

(56) References Cited

U.S. PATENT DOCUMENTS 3,775,823 A * 12/1973 Adolph et al. ................. 75/235
4,197,145 A    4/1980 Hanneman et al.

(Continued)

FOREIGN PATENT DOCUMENTS

EP    0235954    9/1987

(Continued)

OTHER PUBLICATIONS

B. Tveten, et al, Hydrogen in Chromium: Influence on the High-Temperature Oxidation Kinetics in $O_2$, Oxide-Growth Mechanisms, and Scale Adherence, *Oxidation of Metals*, vol. 51, Nos. 3/4, 1999.

*Primary Examiner*—Daniel Jenkins
(74) *Attorney, Agent, or Firm*—Bingham McCutchen LLP

(57) ABSTRACT

The present invention relates to a component (1) comprising an element (2), which contains zirconium or a zirconium alloy and which has a surface (3) on which a corrosion protective layer (4) is formed, the oxide layer (4) comprising zirconium oxide. The component (1) is intended to be in an oxidising environment (6) and said oxide layer (4) has an outer surface (5) towards said oxidising environment (6). The element (2) comprises a layer (10), that borders said surface (3) and comprises hydrogen and at least one metal from the group of lanthanum elements and/or from the group platinum metals and/or yttrium which in its elemental form or as an oxide have the ability to effectively dissociate oxygen and $H_2O$. The invention also relates to a method for manufacturing the component (1) and a nuclear facility comprising the component (1).

13 Claims, 9 Drawing Sheets

U.S. PATENT DOCUMENTS

| | | | |
|---|---|---|---|
| 5,035,957 A | * | 7/1991 | Bartlett et al. ............... 428/552 |
| 5,427,866 A | * | 6/1995 | Nagaraj et al. ............. 428/610 |
| 5,475,723 A | | 12/1995 | Marlowe |
| 5,493,592 A | * | 2/1996 | Garzarolli et al. .......... 376/416 |
| 5,539,791 A | * | 7/1996 | Garzarolli et al. .......... 376/417 |
| 5,793,830 A | * | 8/1998 | Kim et al. .................. 376/305 |
| 5,814,262 A | * | 9/1998 | Ketcham et al. ............ 264/316 |
| 5,901,193 A | * | 5/1999 | Dahlback et al. ........... 376/416 |
| 6,025,078 A | * | 2/2000 | Rickerby et al. ............ 428/469 |
| 6,103,386 A | * | 8/2000 | Raybould et al. ............ 428/472 |
| 6,183,888 B1 | * | 2/2001 | Alperine et al. ............. 428/670 |
| 6,228,513 B1 | * | 5/2001 | Jaslier et al. ................ 428/639 |
| 6,767,418 B1 | * | 7/2004 | Zhang et al. ................ 148/421 |

FOREIGN PATENT DOCUMENTS

| | | |
|---|---|---|
| EP | 0450440 | 10/1991 |

\* cited by examiner

Zircaloy with approximately 1 ppm by weight of hydrogen.
1 step in $^{16,16}O_2$,
2 step in $^{18,18}O_2$.

Zircaloy with approximately 15 ppm by weight of hydrogen.
1 step in $H_2{}^{18}O$
2 step in $H_2{}^{16}O$ Zircaloy with approximately 40 ppm by weigth of hydrogen
1 step in $^{16,16}O_2$
2 step in $^{18,18}O_2$ Oxidation rate of Zircaloy-2 tubes in 20 mbar $O_2$ at 450°C v.s.
hydrogen content in sample. Oxide thickness approximately 25μm.

Oxidationshastighet v.s. vateinnehåll under exponering av Zircaloy-2 rör i c:a 20 mbar H₂O Logarithmic presentation of $O_2$-dissociation rate vs. reciprocal temperature on six different materials.

Oxidation of Zr in 20 mbar O₂ at 450°C

Oxidation of Zr at 450°C in approximately 20 mbar $O_2$.
Influence of hydrogen, and coating of cerium oxide,
platinum and ruthenium oxide.

COMPONENT INCLUDING A ZIRCONIUM ALLOY, A METHOD FOR PRODUCING SAID COMPONENT, AND A NUCLEAR PLANT INCLUDING SAID COMPONENT

THE BACKGROUND OF THE INVENTION AND PRIOR ART

The present invention relates to a component comprising an element, which comprises zirconium or a zirconium alloy and which has a surface on which a corrosion protective oxide layer is formed, which oxide layer comprises zirconium oxide, wherein the component is intended to be in an oxidising environment and said oxide layer has an outer surface towards said oxidising environment. The invention also relates to a method for manufacturing a component comprising an element, which comprises zirconium or a zirconium alloy and which has a surface on which a corrosion protective oxide layer is formed, which comprises zirconium oxide, wherein the component intended to be in an oxidising environment and said oxide layer has an outer surface towards said oxidising environment, and a nuclear facility comprising a reactor.

In a nuclear facility, the reactor core comprises a number of fuel assemblies, which comprise a top plate and a bottom plate with a number of elongated, parallely placed tubular elements extending between the top plate and the bottom plate and a number of spacers axially distributed along and connected to the elongated tubular elements. The fuel assembly also comprises a large number of elongated fuel rods which are kept in place by the spacers between the top plate and the bottom plate according to a specific pattern and on specific distances relative to each other and to the elongated tubular elements. Each fuel rod contains nuclear fuel enclosed in a cladding tube. When the nuclear facility is in operation the reactor core is cooled with the help of a cooling medium being pumped upwards through the reactor core.

Components in nuclear facilities are often subjected to attacks caused by hydration and oxidisation hence it may be interesting to deposit a coating on the surface of the components to protect them. Cladding tubes for nuclear fuel is an example of such components. An attack on a cladding tube for nuclear fuel means in the worst possible case that a damage extending through the entire thickness of the cladding tube occurs so that the radioactive nuclear fuel inside the cladding tube leaks out into the cooling water of the reactor. This may be caused by both primary and secondary defects on the cladding tube.

Primary defects occur from attacks on the outer surface of the cladding tube and are in particular caused by wear from foreign objects. A primary defect extending through the whole thickness of the cladding tube means that water, steam or a combination of these streams in through the defect so that an area between the fuel and the inner surface of the cladding tube is filled with the water, the steam or the combination of these. The presence of the water, the steam or the combination of these in this area means that the cladding tube is in danger of being damaged through attacks on the inside of the tube. This attack is often caused through hydration. Such a defect is called a secondary defect and can only occur after a primary defect already has occurred. Both primary defects and secondary defects extending through the entire thickness of the cladding tube means that the nuclear fuel inside the cladding tube, and thus radioactivity, leaks out into the cooling water of the reactor. Secondary defects may occur at relatively long distances from the primary defects and have also usually the shape of long cracks or transverse breaks meaning that they are a serious type of defect.

Zirconium is often used in materials for cladding tubes, which enclose the nuclear fuel in reactors because of its low neutron absorption ability and its good corrosion resistance. In order to enhance the mechanical properties of the material and to increase its corrosion resistance the cladding material is alloyed for example with tin with about a percentage of weight and with smaller contents of iron, nickel and chrome. The total content of alloying materials can be about some percentages of weight. During operation the cooling water reacts with the cladding tube and forms zirconium oxide, wherein hydrogen is released. Zirconium oxide is relatively corrosion resistant. In an oxidising environment this depends on the fact that the. oxide layer formed can resist further attacks. How efficiently the oxide layer can resist further attacks is mostly governed by the oxygen and hydrogen transport in the oxide. Hydrogen can react with the cladding material and form zirconium hydride, which can lead to large cracks being formed in the cladding material. It should be noted, however, that small amounts of contaminants might exist in the alloy, wherein hydrogen is usually mentioned. A typical content of hydrogen is about 10 ppm by weight.

That hydrogen is regarded as a contaminant is based partly on the knowledge of embrittlement of a metal through absorption of large amounts of hydrogen, a so-called hydrogen embrittlement. Hydrogen embrittlement means that the metal cracks more easily during mechanical stress. Hydrogen embrittlement may happen if the metal is heated in a hydrogen rich environment or if hydrogen is formed at the metal surface, for example in connection with corrosion, pickling and electrochemical surface treatment.

How efficiently the oxide layer can resist further attacks also depends on the presence of microscopic pores, cavities and cracks in the oxide layer. An oxide layer that only grows in the interface between the oxide layer and the surrounding gas/liquid by way of metal transport through the oxide layer tends to have a bad adherence to the metal substrate. Furthermore an oxide layer growing only in the interface between the metal substrate and the oxide layer tends to crack in the interface towards the surrounding gas/liquid. A prerequisite for pores, cavities and cracks to be able to disappear during the growth of the oxide layer is that an oxide is formed at the surfaces adjacent to these pores, cavities and cracks which in turn assumes that oxygen, preferably in dissociated form, and metal are transported to said surfaces.

In "Oxidation of Metals, Vol. 51, Nos ¾, 1999; Hydrogen in Chromium: Influence on the high-temperature Oxidation Kinetics in $O_2$, Oxide-Growth Mechanisms, and Scale Adherence; B Tveten et al." it has been reported that an increased hydrogen content in chromium leads to increased metal transport and increased oxide growth in the interface between the oxide layer and the surrounding gas phase. It is also reported in said article that the presence of hydrogen in the metal results in less adherence of the oxide layer to the metal through decreased oxidisation in the interface between the metal and the oxide layer. Thus the presence of hydrogen in metal contributes to a decreased corrosion resistance.

EMBODIMENTS OF THE INVENTION

The purpose with the present invention is to provide a zirconium based alloy with such a composition that a sustainable balance between metal and oxygen transport is achieved in the oxide layer formed when the zirconium based alloy is present in an oxidising environment. In this way dense and durable oxide layers are obtained which can efficiently resist further attacks. In particular these properties shall be optimised in respect of an application where the metal alloy is subjected to elevated radiation of the type of fast neutrons in a corrosive environment, such as in the reactor core of a nuclear facility. The nuclear facility may comprise a boiling water reactor or a pressure water reactor.

The present invention is based on a number of tests made to map out which factors determine the oxidisation and hydration kinetics in zirconium and zirconium alloys, preferably in temperatures about 300–500° C. During these tests the surprising discovery has been made that with the component mentioned in the introduction which has the characteristics defined in the characterising part of claim 1, said metal will contribute to make the oxide layer more dense by oxide growth in the surfaces of the oxide layer which are adjacent to pores, cavities and cracks, wherein these defects will be minimised. In this way a dense and durable oxide layer will be formed, which will increase the corrosion resistance of the component in oxidising environments. By platinum metals is meant platinum, palladium, rhodium, iridium, osmium and ruthenium.

The purposes are also achieved with the method mentioned in the introduction, which is characterised in that the component is treated in such a way that at least one layer of the element which faces said surface comprises hydrogen and at least one metal from the group of lanthanum elements and/or from the group platinum metals and/or yttrium which in its elementary form or as an oxide have the ability to effectively dissociate oxygen and $H_2O$.

DESCRIPTION OF THE DRAWINGS

In the following description of performed tests the attached drawings will be referred to, in which FIGS. 1$a$–$c$ shows three diagrams illustrating the oxygen occurrence as a function of the oxide depth for samples comprising a zirconium alloy with different hydrogen content.

DETAILED DESCRIPTION OF THE DRAWINGS

Figure 1A:
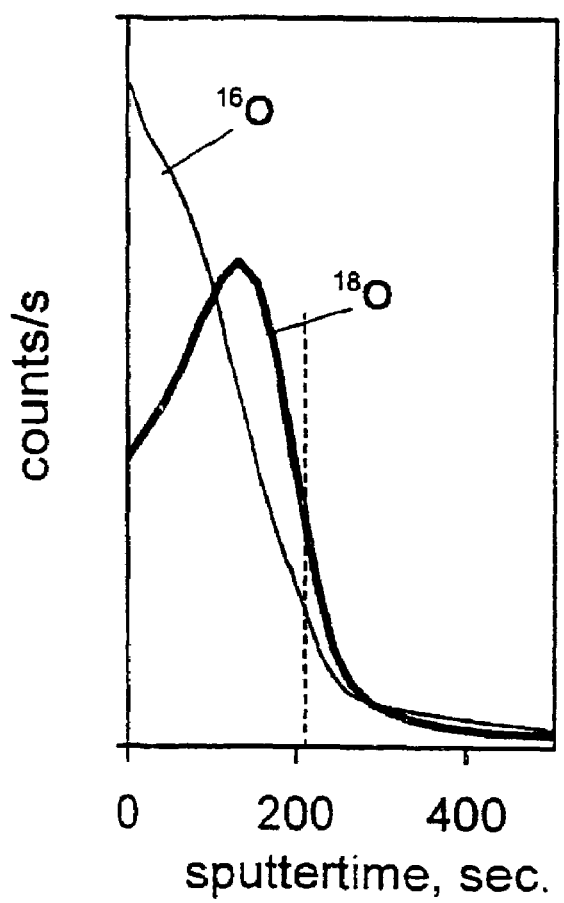

Most tests have been carried out on tubes comprising a zirconium alloy called Zircaloy-2. Zircaloy-2 comprises about 10 ppm by weight of hydrogen. When components of zirconium alloys are present in an oxidising environment an oxide layer is formed on the surface being in contact with the environment. In order to map out how, for example, the hydrogen content in a zirconium alloy affects the metal transport in such an oxide layer tests have been carried out on tubes of Zircaloy-2 which have been hydrogenated, i.e. been brought to assimilate hydrogen by means of diffusion, of different degrees by being hydrogenated for different times. The hydrogenation has been carried out in two steps, where in a first step the tube of Zircaloy-2 in question has been exposed to hydrogen gas in an oven at 400° C. during a certain time and in a second step been placed in a vacuum oven in order to level out possible hydrogen gradients. In this way the tubes have been brought to contain a certain hydrogen content, at least in a layer closest to the surface of the tube being in contact with the inner atmosphere of the oven. In the following when tubes of Zircaloy-2 with hydrogen contents above 10 ppm by weight are mentioned it is assumed that they have been treated in this way. However, when in the following, tubes of Zircaloy-2 are mentioned with a hydrogen content <10 ppm by weight the tube in question have been degassed of hydrogen at 800° C. for a certain time so that at least a layer closest to the surface being in contact with the environment comprises less than 10 ppm by weight hydrogen.

In order to examine how the hydrogen content of a zirconium alloy affects the metal transport in the zirconium oxide a two-step oxidisation was carried out in $O_2$ and $H_2O$ respectively. The two-step oxidisation is an established method whose purpose is to give information of where oxide is growing in the oxide layer. It is performed so that a sample, in this case a tube of Zircaloy-2, first is oxidised in $^{16,16}O_2/H_2O^{16}$ and thereafter in $^{18,18}O_2/H_2O^{18}$ or vice versa. By thereafter determining how $^{16}O$ and $^{18}O$ varies with depth in the oxide layer information can be obtained on where oxide was formed at the latest. Three tests have been carried out on tubes of Zircaloy-2 with different hydrogen content. After the oxidisation tests the tubes have been coated with a thin layer of Au in order to avoid charging during the analysis. The horizontal axis indicates the depth in the oxide layer, wherein the interface between the oxide layer and the oxidising environment coincides with the origin and the vertical axis indicates the presence of the respective oxygen isotopes in the oxide layer.

In FIG. 1$a$ the results are reported for a tube of Zircaloy-2 with a hydrogen content of about 1 ppm by weight. In a first step the tube is oxidised in $^{16,16}O_2$ and in a second step the same tube is oxidised in $^{18,18}O_2$. Where the oxide layer borders the tube is marked with a dotted line. As shown in FIG. 1$a$ $^{18}O$ is present mainly close to the interface between the oxide layer and the tube, thus the conclusion is that the oxide transport in the oxide layer towards the tube is higher than the metal transport in the oxide layer towards the oxidising environment.

In FIG. 1$b$ the results are reported for a tube of Zircaloy-2 with a hydrogen content of about 15 ppm by weight. In a first step the tube is oxidised in $H_2^{18}O$ and in a second step the same tube is oxidised in $H_2^{16}O$. Where the oxide layer borders the tube is marked with a dotted line. As shown in FIG. 1$b$ the difference between the presence of $^{16}O$ in close vicinity to the interface between the oxide layer and the oxidising environment and the presence of $^{16}O$ in close vicinity of the interface between the oxide layer and the tube is less than the corresponding difference in FIG. 1$a$. In FIG. 1$a$ it is the difference between the presence of $^{18}O$ that may be studied. Thus the oxide growth in $H_2O$ for a tube of Zircaloy-2 with a hydrogen content of about 15 ppm by weight is larger in the vicinity to the interface between the oxide layer and the oxidising environment than on the corresponding place for a tube of Zircaloy-2 with a hydrogen content of about 1 weight ppm, which was oxidised in $O_2$. The conclusion one can make of these two tests is that the metal transport has increased in direction towards the interface between the oxide layer and the oxidising environment with increasing hydrogen content.

Figure 1B:
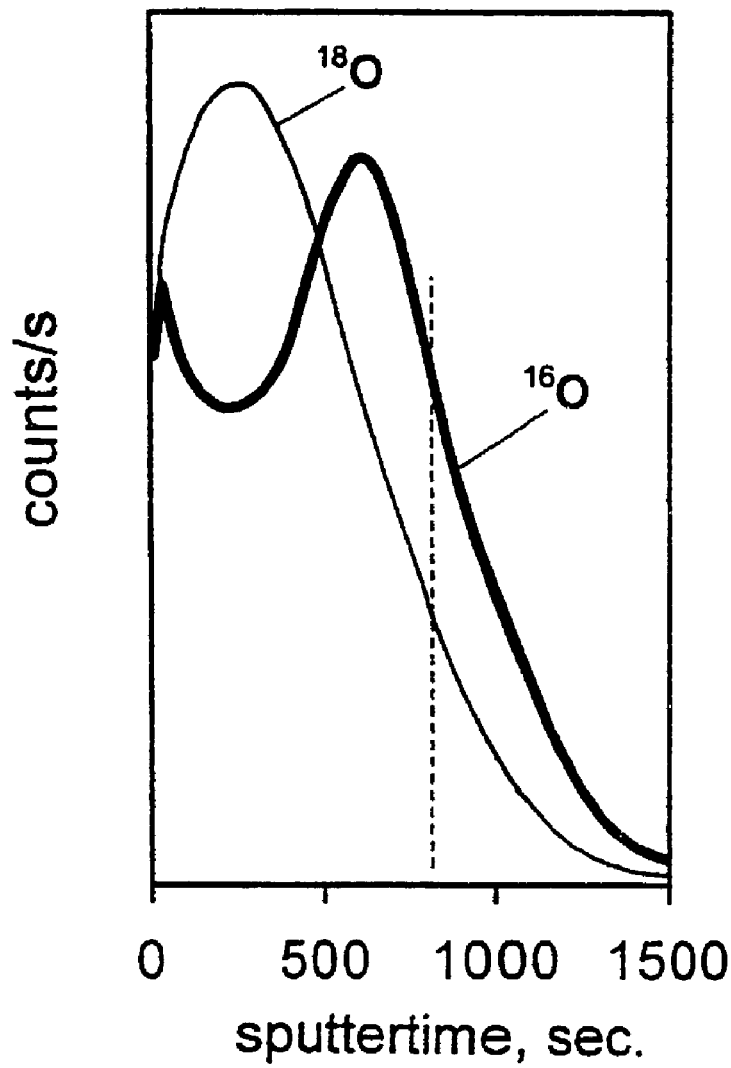
Figure 1C:
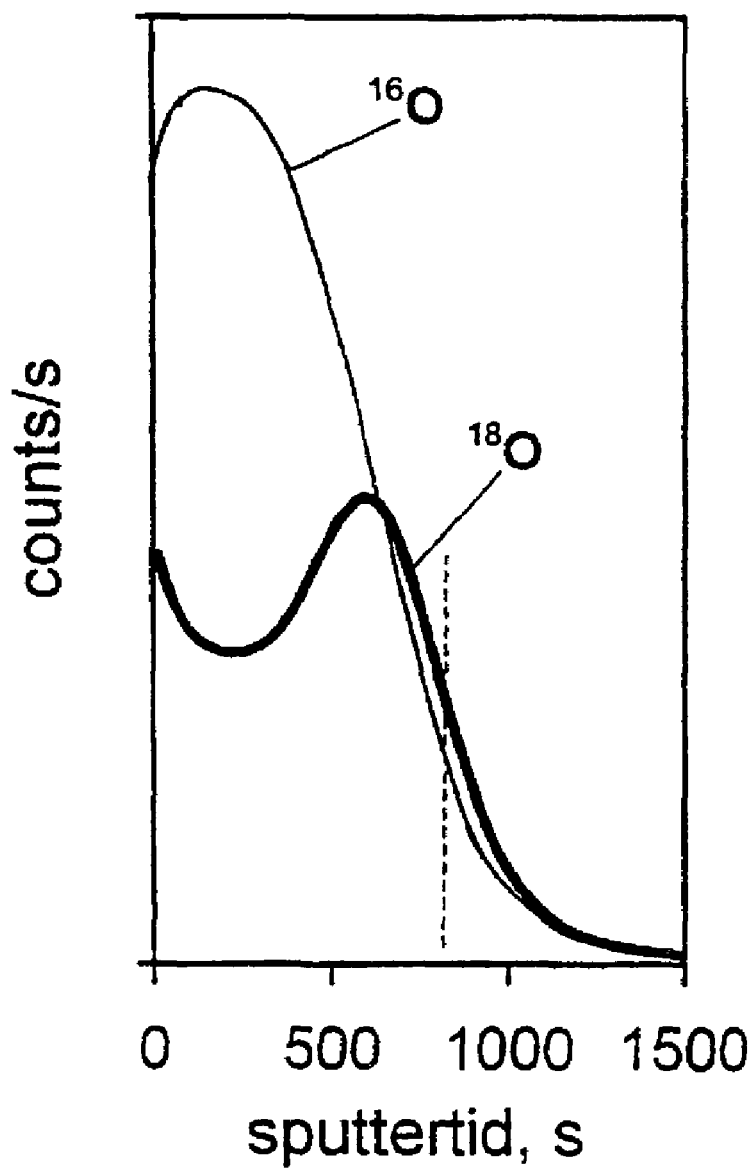

In FIG. 1c the results are reported for a tube of Zircaloy-2 with a hydrogen content of about 40 ppm by weight. In a first step the tube is oxidised in $^{16,\ 16}O$ and in a second step the same tube is oxidised in $^{18,\ 18}O$. Where the oxide layer borders the tube is marked with a dotted line. As shown in FIG. 1c the presence of $^{18}O$ in the vicinity to the interface between the tube and the oxide layer is essentially equal to the presence of $^{18}O$ in the vicinity of the interface between the oxide layer and the oxidising environment.

The conclusion from the test series being reported in connection with FIGS. 1a–c is that an increased hydrogen content in a zirconium alloy leads to an increased oxide growth in the interface between the oxide layer and the oxidising environment because of an increased metal transport in the oxide layer.

Figure 2:
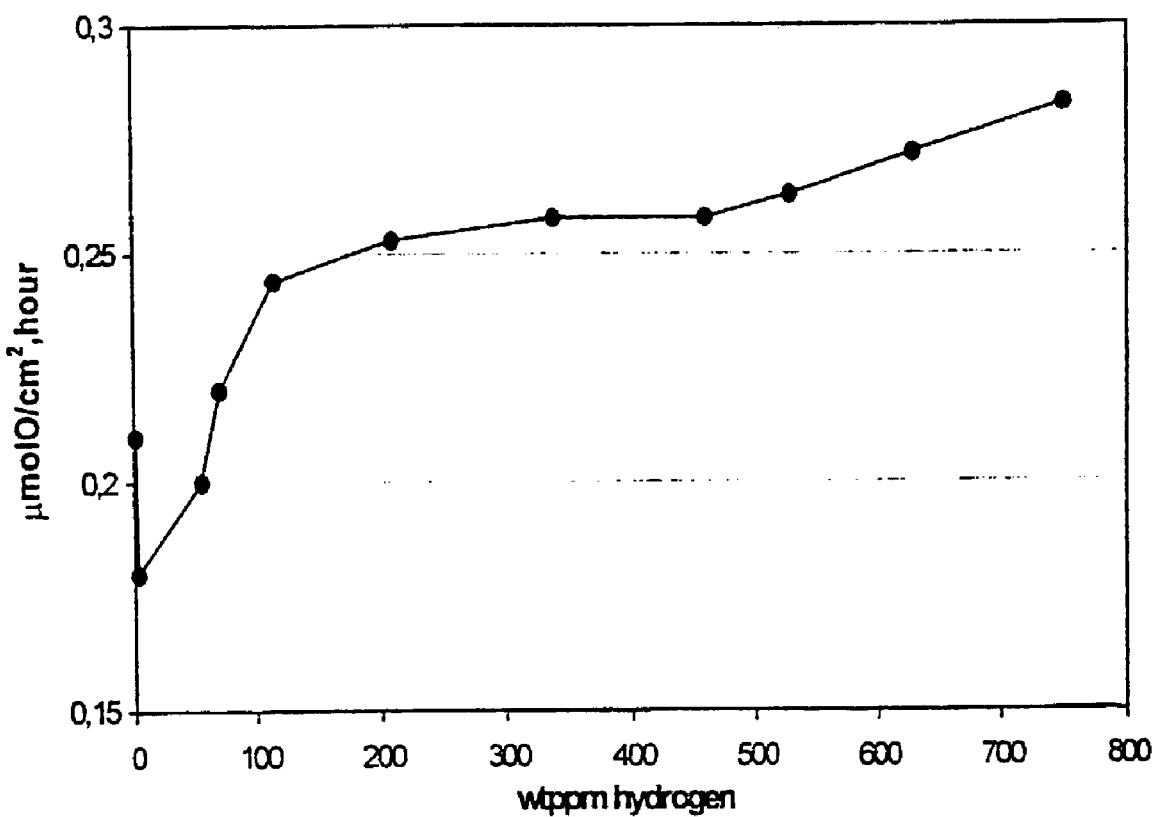
FIG. 2 shows a diagram illustrating the oxygen absorption rate as a function of hydrogen content for samples of a zirconium alloy exposed in 20 mbar $O_2$ at 450° C.

For a component comprising a zirconium alloy and being designed to be in a nuclear reactor one strives for a slow oxidisation rate. Tests have been carried out on tubes of Zircaloy-2 where the hydrogen content have varied from essentially 0 to a few hundred ppm by weight and where the tubes have been exposed in 20 mbar $O_2$ at 450° C. The result is illustrated in a diagram in FIG. 2. The horizontal axis indicates the hydrogen content in ppm by weight and the vertical axis indicates the oxygen absorption rate in $\mu molO/cm^2 \cdot hour$. The oxide thickness has been between 20–30 $\mu m$. The conclusion one can make from this test series is that the oxygen absorption rate, i.e. the oxidisation rate is larger for a tube of Zircaloy-2 without presence of hydrogen than for a tube of Zircaloy-2 with a hydrogen content of about 10 ppm by weight.

In order to have an oxide growth in vicinity of the contact surface between the oxide layer and the oxidising environment it is constructive if a zirconium alloy comprises hydrogen, compare with the reports of the tests in connection with FIGS. 1a–c. If however, the oxide growth primarily takes place in vicinity of the interface between the oxide layer and the oxidising environment the adherence of the oxide layer to the zirconium alloy may deteriorate and lead to cracking and in the worst case flaking, so called scaling, wherein the corrosion rate increases and therewith the consumption of metal increases. Furthermore the oxide growth on a component comprising a zirconium alloy and intended to be in a nuclear reactor where the cooling medium comprises water means that hydrogen gas is produced during the oxidisation, wherein hydrogen may be absorbed by the zirconium alloy, i.e. the hydrogen content in the component will increase during operation. Thus there is an upper limit of the content of hydrogen in the zirconium alloy in an introductory phase, i.e. an upper content of hydrogen that deliberately was added to the component.

Figure 3:
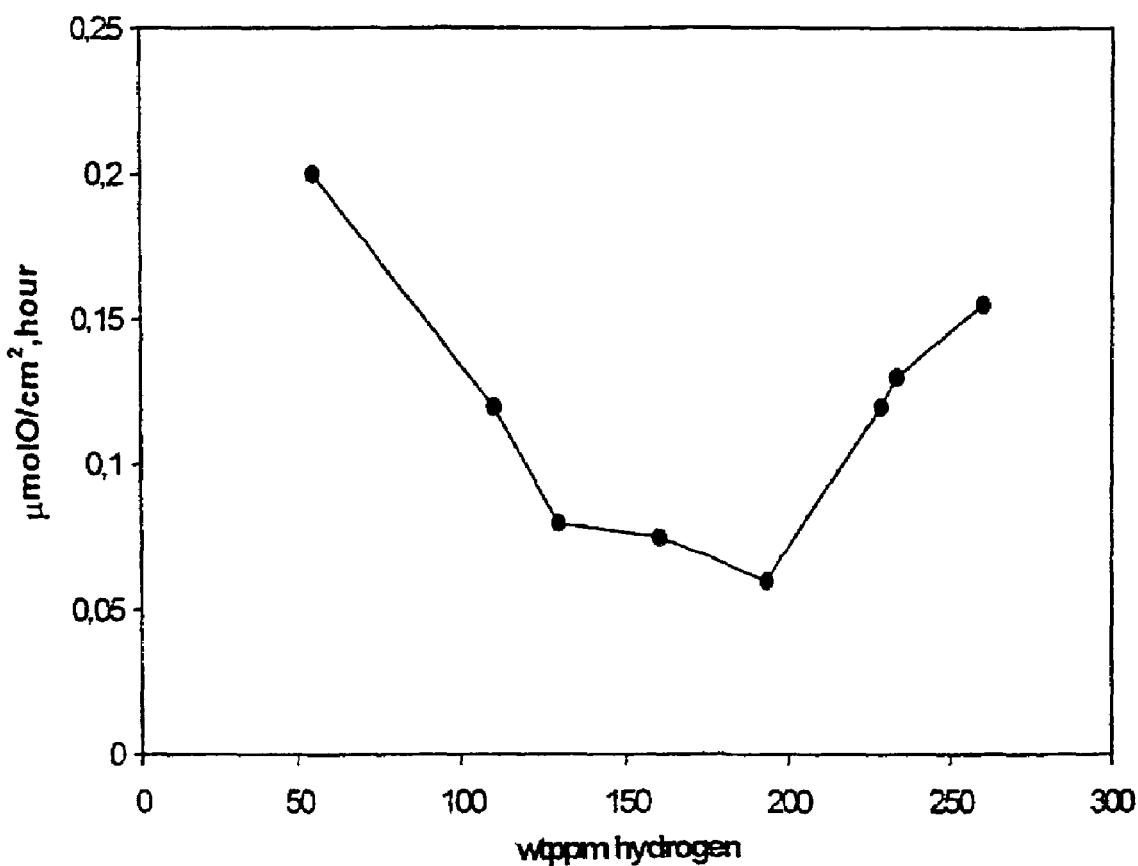
FIG. 3 shows a diagram illustrating the oxygen absorption rate as a function of hydrogen content for samples of a zirconium alloy exposed in 20 mbar $H_2O$ at 450° C.

In one test series tubes of Zircaloy-2 with different contents of hydrogen have been exposed in 20 mbar $H_2O$ at 450° C. The result of this test series is reported in FIG. 3. The horizontal axis indicates the hydrogen content in ppm by weight and the vertical axis indicates the oxygen absorption rate in $\mu molO/cm^2 \cdot hour$. A conclusion one can make from this test series is that the oxygen absorption rate, i.e. the oxidisation rate, decreases with increased hydrogen content until a hydrogen content of about 200 ppm by weight, after which the oxidisation rate increases. Thus the hydrogen content in a component comprising a zirconium alloy should not in an introductory phase surpass 200 ppm by weight when oxidised in $H_2O$, i.e. at the most 200 ppm by weight of hydrogen should deliberately be added to the component.

The oxide layer of a component, in this case a component comprising a zirconium based alloy, can effectively resist the corrosion attack when the component is in an oxidising environment if the zirconium based alloy has such a composition that a durable balance between metal and oxygen transport is obtained in the oxide layer. It is thus necessary that it exists partly an oxygen transport and partly a metal transport towards the surfaces of the oxide layer which are adjacent to pores, cavities and cracks in the oxide layer so that oxide can be formed at these surfaces and therewith decrease the size of said pores, cavities and cracks, wherein a denser oxide layer is formed. One can roughly separate three areas from where it is desirable with formation of oxide, namely in connection to cavities present in the oxide layer where the latter borders the component, in connection to pores in the oxide layer and in connection to the cracks present in the oxide layer where the oxide layer adjoins the oxidising environment, cf. FIGS. 7a–b. As reported in connection to FIGS. 1a–c a better metal transport in the oxide layer is obtained if the zirconium alloy comprises hydrogen. However it has been shown in the tests performed that zirconium oxide does not dissociate oxygen sufficiently efficiently to obtain a sufficiently good balance between the transport of dissociated oxygen and the transport of metal in the oxide layer, wherein a dense and durable oxide layer which effectively can resist further attacks is not obtained. Above all this is true for temperatures <500° C. In a light water reactor in operation the temperature in the reactor is less than 500° C. The temperature in the reactor is rather around 300° C.

A prerequisite to obtain oxide growth in the vicinity of the interface between the oxide layer and the zirconium alloy is that oxygen is transported thereto through for example grain boundaries or channels in the oxide layer. If oxygen is transported in the form of O and/or $O_2$ in the oxide layer the $O_2$-molecules first have to dissociate. To examine whether the $O_2$-molecules dissociate, a mixture of $^{16,\ 16}O_2$ and $^{18,\ 18}O_2$ may be used during the oxidisation, wherein one can follow the kinetics of the formation of $^{16,\ 18}O_2$-molecule.

Figure 4:
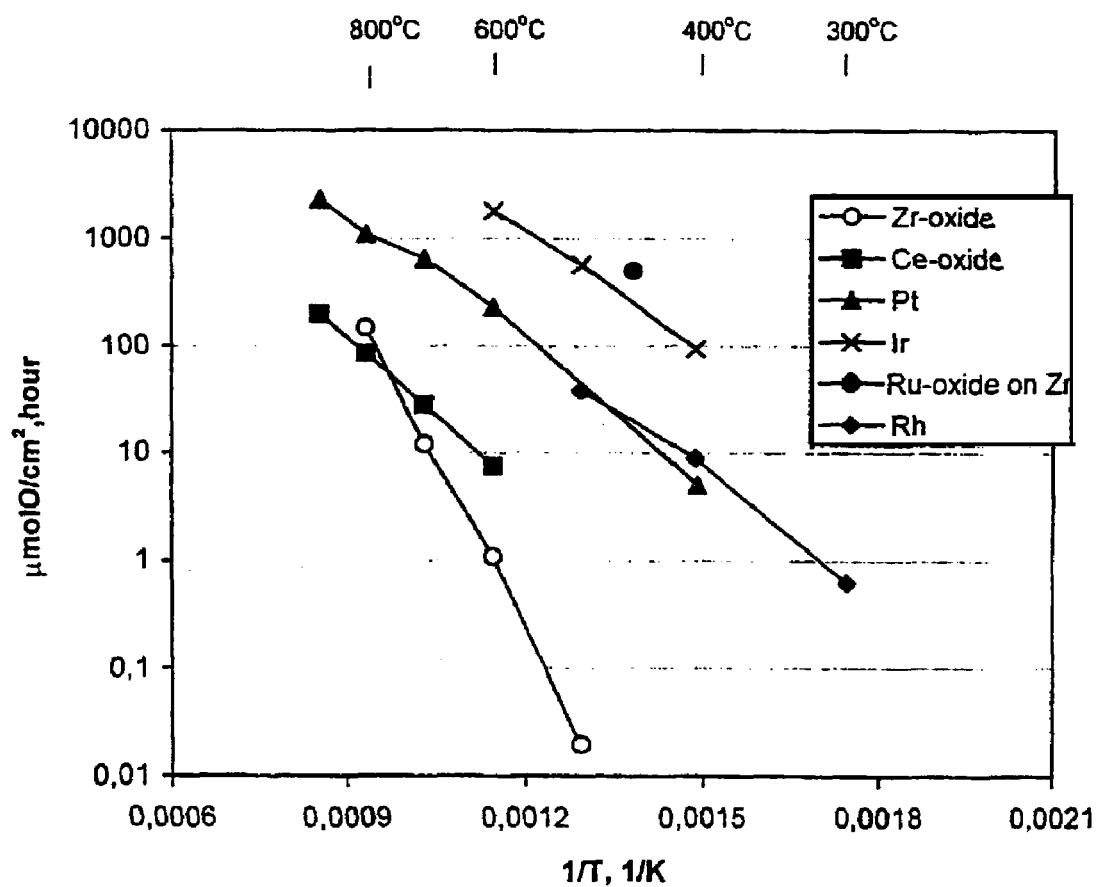
FIG. 4 shows a diagram illustrating the dissociation rate of $O_2$ as a function of the reciprocal temperature for different materials exposed in 20 mbar $O_2$.

Tests have been performed where the rate of formation of $^{16,18}O_2$ have been measured when exposing different materials in $^{16,\ 16}O_2$ and $^{18,\ 18}O_2$ at 20 mbar, wherein the temperature has been varied. The test series is reported in FIG. 4. The horizontal axis indicates the reciprocal temperature in 1/K and the vertical axis indicates the logarithm of the dissociation rate of $O_2$ in $\mu mol\ O/cm^2$, hour. On the topside of FIG. 4 the temperature in ° C. is given. Six samples have been analysed, a first sample comprising zirconium oxide, a second sample comprising cerium oxide, a third sample of platinum, a fourth sample comprising rhodium, a fifth sample comprising iridium and a sixth sample comprising ruthenium, and more precisely ruthenium oxide applied onto zirconium oxide. The oxygen molecules are dissociated at the interface to the surrounding atmosphere. As shown in FIG. 4 the oxygen dissociation rate is high for zirconium or rather its oxide at temperatures>about 800° C. At temperatures<500° C. the oxygen dissociation rate is higher for cerium oxide, platinum, rhodium, iridium and ruthenium oxide than for zirconium oxide. The conclusion one can make from this test series is that at low temperatures (<500° C.) an increased transport of dissociated oxygen is made possible by the presence of cerium oxide and in particular of platinum, rhodium, iridium and ruthenium oxide.

Figure 5:
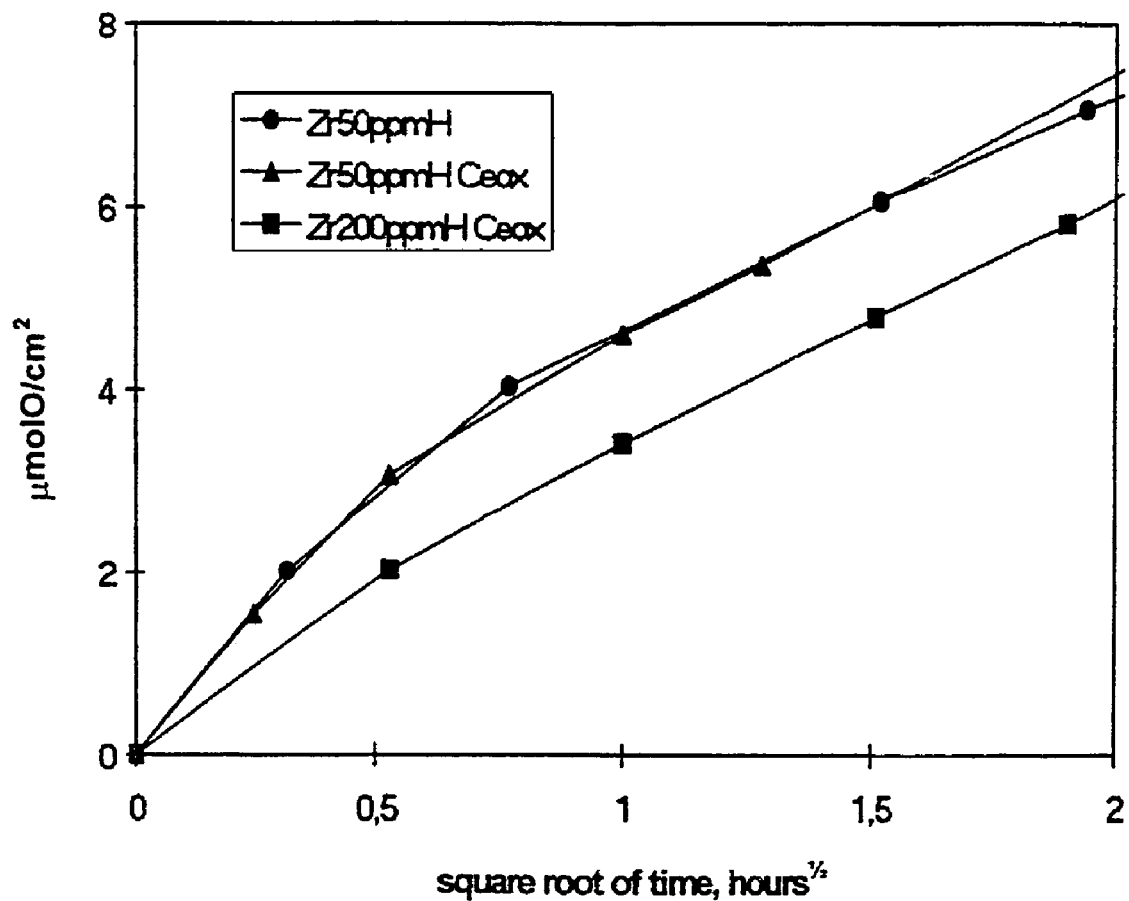
FIG. 5 shows a diagram illustrating the oxide growth for samples of zirconium with different hydrogen content which have been exposed in $O_2$ at 450° C., wherein two samples have been treated with cerium.

In FIG. 5 the results are reported from a test series made on a sample of zirconium being exposed in 20 mbar $O_2$ at 450° C. The samples have been polished mechanically with SiC-paper to 1200 mesh. Three samples have been analysed, namely zirconium with a hydrogen content of about 50 ppm by weight, zirconium with a hydrogen content of about 50 ppm by weight coated with cerium oxide and zirconium with a hydrogen content of about 200 weight-ppm coated with cerium oxide. The coating can for example be applied by painting the sample with cerium oxide together with an indifferent carrier, after which a drying is carried out, preferably at an elevated temperature. Alternatively the coating can be applied by dipping the sample in a liquid medium containing cerium oxide, after which drying is carried out, preferably at an elevated temperature. The horizontal axis indicates the oxidisation time and the vertical axis indicates the oxygen absorption in $\mu molO/cm^2$. As shown in FIG. 5 the oxygen absorption rate, i.e. the oxidisation rate of the sample with 200 ppm by weight hydrogen with presence of cerium oxide is lower than the oxidisation rate of the sample with 50 ppm by weight of hydrogen both with and without the presence of cerium oxide. The conclusion one can make from this test series is that the best balance between the oxygen transport and the metal transport concerning the oxidation in FIG. 5 is obtained in the oxide layer of the sample with a hydrogen content of about 200 ppm by weight, which have been treated with cerium oxide.

Figure 6:
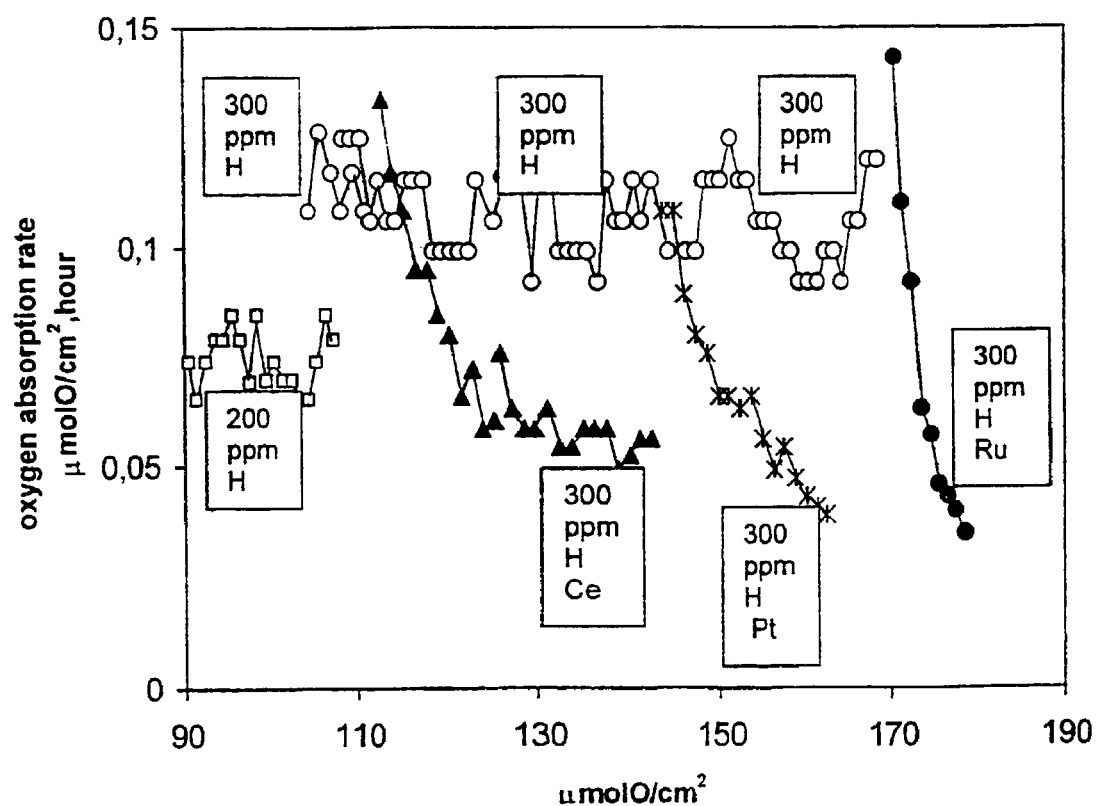
FIG. 6 shows a diagram illustrating the oxygen absorption rate as a function of the oxide layer thickness for samples, treated with hydrogen, cerium, platinum and ruthenium and exposed in $O_2$ at 450° C., and FIG. 7$a$ shows how pores, cavities, and cracks may appear in an oxide layer formed on a component, and FIG. 7$b$ shows row the pores, cavities, and cracks in FIG. 7$a$ have been reduced with the help of oxide growth.

In FIG. 6 a test series is reported which has been performed in order to analyse the influence from hydrogen, cerium, platinum and ruthenium. The horizontal axis indicates the oxygen absorption in $\mu molO/cm^2$ and the vertical axis indicates the oxygen absorption rate in $\mu molO/cm^2$ hour. The starting-point of the test series was two samples of zirconium, which have been polished mechanically with a SiC-paper to 1200 mesh. The samples originally comprised hydrogen to a content of about 200 ppm by weight and was treated with cerium. The samples were exposed in 20 mbar $O_2$ at 450° C. In a second step about 100 ppm by weight of hydrogen has been added to the samples, wherein the samples thus comprised about 300 ppm by weight hydrogen. The sample was then exposed in 20 mbar $O_2$ at 450° C. In a third and fourth step the first sample has again been treated with cerium, wherein this sample after each respective step was exposed in 20 mbar $O_2$ at 450° C. In a fifth and last step this sample has been treated with platinum followed by exposure in 20 mbar $O_2$ at 450° C. The second sample, which also comprised 300 ppm by weight of hydrogen was exposed in 20 mbar $O_2$ at 450° C. to an oxide thickness of about 170 $\mu molO/cm^2$, whereafter the sample was treated with ruthenium. Thereafter, the sample was again exposed in 20 mbar $O_2$ at 450° C. As shown in FIG. 6 the best corrosion resistance i.e. the lowest oxidation rate, for the sample is obtained when it was treated with ruthenium.

Tests have shown that the oxide on a sample of zirconium which have been treated with platinum protects more effectively against both oxygen absorption and hydrogen absorption than the oxide on a sample of zirconium which has not been treated with platinum, i.e. for the platinum treated sample both the oxidisation rate and the hydration rate is lower than for the non-platinum treated sample. This despite the fact that the platinum treated sample contained more hydrogen from the beginning than the non-platinum treated sample. The platinum treated sample contained 300 ppm by weight hydrogen and the non-platinum treated sample contained 180 ppm by weight hydrogen. The results from the tests are reported in the table below. The dissociation rate of $O_2$ is also reported in the table below, where it is clear that the high dissociation rate can be coupled to the low oxygen absorption rate, which is consistent with earlier reported tests.

In the table below the reaction data for zirconium samples exposed in 20 mbar $O_2$ and 20 mbar $H_2$ respectively at 450° C. are shown. The oxide thickness of the samples was about 15 $\mu m$. Sample 1 contained 180 ppm by weight hydrogen and sample 2 contained 300 ppm by weight hydrogen. Furthermore sample 2 was treated with platinum.

|  | Oxygen dissociation rate $\mu molO/cm^2$, hour | Oxygen absorption rate $\mu molO/cm^2$, hour | Hydrogen absorption rate $\mu molH/cm^2$, hour |
|---|---|---|---|
| Sample 1 | <0.02 | 0.085 | 0.54 |
| Sample 2 | 13 | 0.045 | 0.15 |

In a further experiment, an about 2 mm wide area was coated with platinum interiourly in a Zircaloy tube having a length of 1 mm. Thereafter, the tube was exposed interiourly at 370° C. in about 10 mbar water during 72 hours, whereafter an analysis of the absorption of hydrogen and oxygen was performed. On a platinum-coated area, an approximately 40% lower oxygen absorption and an approximately 80% lower hydrogen absorption than on a non-coated area.

Figure 7A:
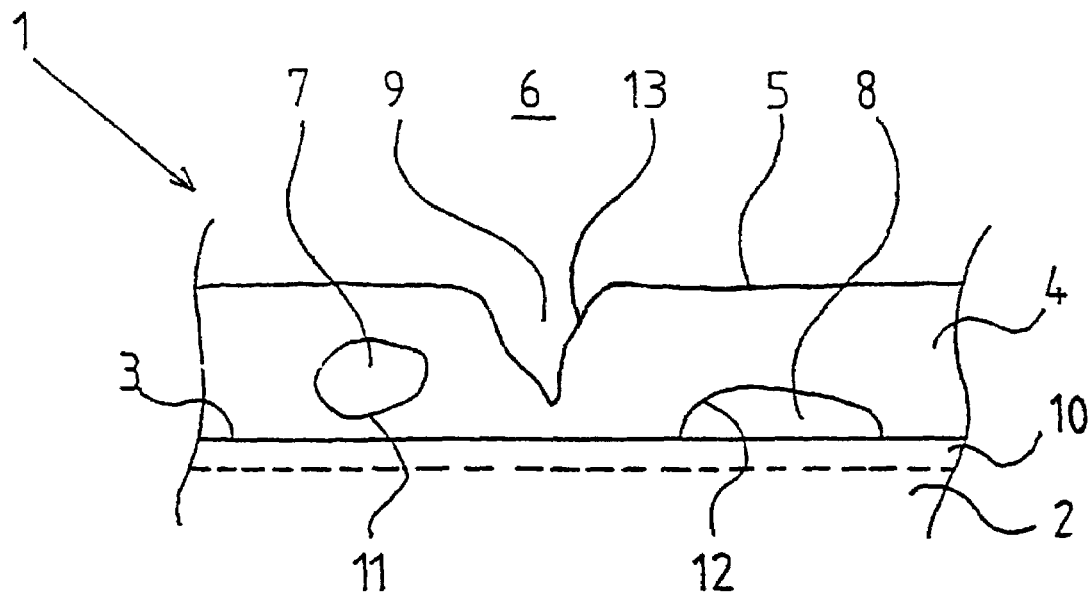
Figure 7B:
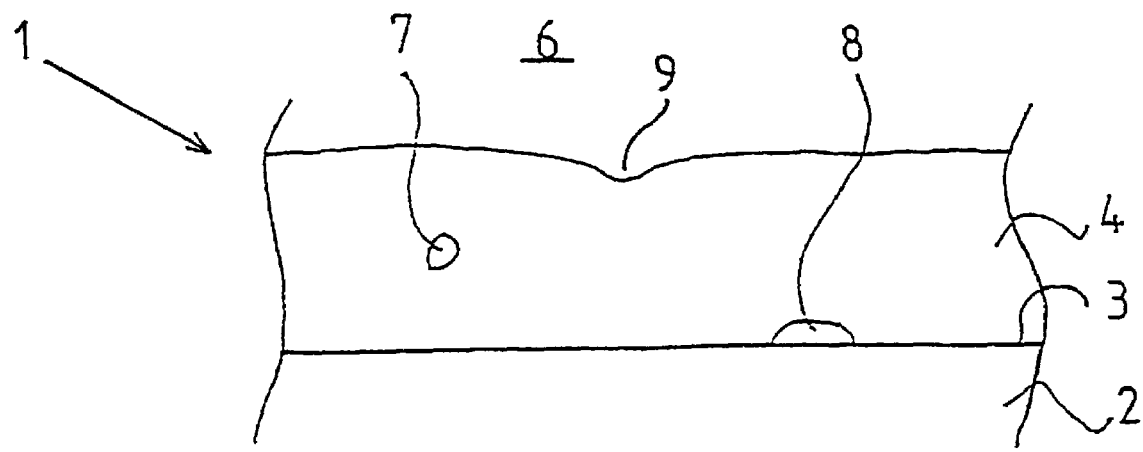

In FIG. 7a a part of a component 1 is shown comprising an element 2, which can contain zirconium or a zirconium alloy. The element 2 has a surface 3 upon which a corrosion protective layer 4 is formed. The oxide layer 4 comprises zirconium oxide. The oxide layer 4 has an outer surface 5 forming an oxidising environment 6. In the oxide layer 4 there are pores 7. Furthermore there are cavities 8 in the oxide layer 4 where the oxide layer borders the surface 3 and cracks 9 in the oxide layer 4 where the oxide layer faces the oxidising environment 6.

As a basis for the present invention and as already mentioned the surprising discovery lies in the contribution of hydrogen and certain metals such as cerium, platinum and ruthenium to making the oxide layer formed on a component 1 of the type described in connection with FIG. 7a more dense. Thus at least one layer 10 of the element 2 has to comprise hydrogen and at least some metal, such as cerium or platinum.

With a component 1 of the type described in connection to FIG. 7a it is possible to obtain a lasting balance between the metal and oxygen transport through the whole oxide layer 4. As shown in FIG. 7a there is a surface 11 facing the pores 7, a surface 12 facing the cavity 8 and a surface 13 facing the crack 9. A durable balance between metal and oxide transport through the whole oxide layer 4 means that an oxide will be formed on the surfaces 11, 12 and 13, wherein the size of the pores, cavities, and cracks will be reduced, cf. FIG. 7b.

Cerium belongs to the metal group of lanthanum elements, wherein the layer 10 may contain any of the metals in said group. Furthermore platinum belongs to the group of platinum metals, wherein the layer 10 may comprise any of the platinum metals, i.e. platinum, palladium, iridium, rhodium, osmium and ruthenium. Furthermore oxygen is more easily dissociated with yttrium than with zirconium, wherein the layer 10 may comprise yttrium. Said metals may be applied on the component 1 by painting the component 1 with the metal together with an indifferent carrier, after which drying takes place, preferably at an elevated temperature. Alternatively the coating may be applied by dipping the component 1 in a liquid medium containing the metal, after which drying takes place, preferably at an elevated temperature. It is also possible to add the metal in connection with manufacturing of the component 1 through mixture of the metal, zirconium and possible other alloying substances in a melted state, i.e. the metal is alloyed into the component. For the last mentioned method for addition of the metal the metal will exist homogeneously throughout the component.

The present invention is not limited to the shown embodiment but can be varied and modified within the scope of the following claims.

The invention claimed is:

1. A fuel assembly for a nuclear reactor, comprising a component (1), which consists of zirconium or a zirconium-based alloy and which has a surface (3) on which a corrosion protective oxide layer (4) is formed, which oxide layer (4) comprises zirconium oxide, wherein the component (1) is intended to be in an oxidizing environment (6) and said oxide layer (4) has an outer surface (5) towards said oxidizing environment (6), characterized in that the component (1) comprises at least one inner layer (10) that borders said surface (3) and thus the oxide layer (4), wherein the inner layer comprises hydrogen, arranged to promote a transport of zirconium outwards towards said outer surface (5), and at least a metal from the group of platinum metals which in its elementary form or as an oxide has the ability to effectively dissociate $O_2$ and $H_2O$, and wherein said inner layer (10) of the component (1) comprises initially at least 20 ppm by weight hydrogen.

2. A component (1) according to claim 1, characterized in that said metal from the group of platinum metals in pure oxygen at an absolute pressure of 20 mbar has an oxygen-dissociating capability, which is substantially equal to or higher than this capability of platinum.

3. A fuel assembly according to claim 1, characterized in that said metal is established to effectively dissociate oxygen and/or $H_2O$ at said outer surface (5).

4. A fuel assembly according to claim 1, characterized in that said layer (10) of the fuel assembly comprises initially at the most 100 ppm by weight hydrogen.

5. A fuel assembly according to claim 1, characterized in that said layer (10) of the component (1) comprises initially at the most 200 ppm by weight hydrogen.

6. A fuel assembly according to claim 1, characterized in that said layer (10) of the component (1) comprises initially about 50 ppm by weight hydrogen.

7. A fuel assembly according to claim 1, characterized in that layer (10) of the component (1) comprises as much of said metal that the dissociation leads to an increased concentration of free oxygen atoms and/or oxygen ions in the oxide layer (4).

8. A fuel assembly according to claim 1, characterized in that said metal comprises platinum.

9. A fuel assembly according to claim 1, characterized in that said metal comprises ruthenium.

10. A fuel assembly according to claim 1, characterized in that said metal comprises iridium.

11. A fuel assembly according to claim 1, characterized in that said metal comprises rhodium.

12. A nuclear facility comprising a reactor, characterized in that the reactor comprises at least one fuel assembly according to claim 1.

13. A nuclear facility according to claim 12, characterized in that the component (1) is a cladding tube for nuclear fuel.

* * * * *